US011681533B2

United States Patent
Gabor et al.

(10) Patent No.: US 11,681,533 B2
(45) Date of Patent: Jun. 20, 2023

(54) RESTRICTED SPECULATIVE EXECUTION MODE TO PREVENT OBSERVABLE SIDE EFFECTS

(71) Applicant: Intel Corporation, Santa Clara, CA (US)

(72) Inventors: Ron Gabor, Herzliya (IL); Alaa Alameldeen, Hillsboro, OR (US); Abhishek Basak, Hillsboro, OR (US); Fangfei Liu, Hillsboro, OR (US); Francis McKeen, Portland, OR (US); Joseph Nuzman, Haifa (IL); Carlos Rozas, Portland, OR (US); Igor Yanover, Yokneam Illit (IL); Xiang Zou, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/443,593

(22) Filed: Jun. 17, 2019

(65) Prior Publication Data

US 2020/0272474 A1 Aug. 27, 2020

Related U.S. Application Data

(60) Provisional application No. 62/810,288, filed on Feb. 25, 2019.

(51) Int. Cl.
*G06F 9/30* (2018.01)
*G06F 9/38* (2018.01)
(Continued)

(52) U.S. Cl.
CPC ........ *G06F 9/3842* (2013.01); *G06F 9/30043* (2013.01); *G06F 9/30047* (2013.01);
(Continued)

(58) Field of Classification Search
CPC ............ G06F 9/30189; G06F 9/30076; G06F 9/30043; G06F 9/30047; G06F 9/3842
See application file for complete search history.

(56) References Cited

U.S. PATENT DOCUMENTS

| 5,611,063 | A | 3/1997 | Loper et al. |
| 6,854,048 | B1 * | 2/2005 | Dice ................... G06F 9/30181 |
| | | | 711/147 |

(Continued)

FOREIGN PATENT DOCUMENTS

| CN | 109215728 A | 1/2019 |
| WO | 2019/074772 A1 | 4/2019 |

OTHER PUBLICATIONS

European Search Report and Search Opinion, EP App. No 20155110.8, dated Jun. 25, 2020, 9 pages.

(Continued)

*Primary Examiner* — Jacob Petranek
(74) *Attorney, Agent, or Firm* — Nicholson De Vos Webster & Elliott LLP

(57) ABSTRACT

Embodiments of methods and apparatuses for restricted speculative execution are disclosed. In an embodiment, a processor includes configuration storage, an execution circuit, and a controller. The configuration storage is to store an indicator to enable a restricted speculative execution mode of operation of the processor, wherein the processor is to restrict speculative execution when operating in restricted speculative execution mode. The execution circuit is to perform speculative execution. The controller to restrict speculative execution by the execution circuit when the restricted speculative execution mode is enabled.

15 Claims, 10 Drawing Sheets

(51) Int. Cl.
  *G06F 12/1027* (2016.01)
  *G06F 21/57* (2013.01)
(52) U.S. Cl.
  CPC ...... *G06F 9/30101* (2013.01); *G06F 9/30189* (2013.01); *G06F 12/1027* (2013.01); *G06F 21/57* (2013.01); *G06F 2212/68* (2013.01); *G06F 2221/034* (2013.01)

(56) References Cited

U.S. PATENT DOCUMENTS

| | | | |
|---|---|---|---|
| 7,219,249 | B1 | 5/2007 | Ghose et al. |
| 9,575,763 | B2 | 2/2017 | Fleischman et al. |
| 10,963,567 | B2 | 3/2021 | Johnson et al. |
| 2004/0154012 | A1 | 8/2004 | Wang et al. |
| 2007/0294482 | A1* | 12/2007 | Kadambi ............ G06F 9/30047 711/137 |
| 2009/0089564 | A1* | 4/2009 | Brickell ................ G06F 9/3846 712/239 |
| 2010/0262967 | A1 | 10/2010 | Eisen et al. |
| 2012/0102357 | A1* | 4/2012 | Ramani ................ G06F 9/3834 714/15 |
| 2012/0173848 | A1 | 7/2012 | Sun et al. |
| 2015/0178513 | A1 | 6/2015 | Conti et al. |
| 2015/0186285 | A1 | 7/2015 | Kitchin |
| 2017/0090930 | A1 | 3/2017 | Priyadarshi et al. |
| 2017/0161194 | A1* | 6/2017 | Loh ..................... G06F 12/1054 |
| 2019/0114422 | A1* | 4/2019 | Johnson ................ G06F 9/3865 |
| 2019/0286443 | A1* | 9/2019 | Solomatnikov ....... G06F 9/3848 |
| 2019/0332384 | A1* | 10/2019 | Calhoun ............. G06F 12/1425 |
| 2020/0065112 | A1* | 2/2020 | Gotze ................. G06F 9/30058 |
| 2020/0301712 | A1 | 9/2020 | Sakalis et al. |
| 2021/0173931 | A1 | 6/2021 | Johnson et al. |

OTHER PUBLICATIONS

Oleksenko et al., "You Shall Not Bypass: Employing data dependencies to prevent Bounds Check Bypass", Technical Report, May 24, 2018, pp. 1-6.
Non-Final Office Action, U.S. Appl. No. 16/728,815, dated Feb. 17, 2021, 21 pages.
Final Office Action, U.S. Appl. No. 16/728,815, dated Jul. 8, 2021, 20 pages.
Barber et al., "Isolating Speculative Data to Prevent Transient Execution Attacks", IEEE Computer Architecture Letters, vol. 18, Issue 2, Jul.-Dec. 2019, pp. 178-181.
Chandlerc, "Introduce a new pass to do Speculative Load Hardening to mitigate Spectre", Jul. 13, 2018, 56 pages.
Corbet, Jonathan, "Meltdown/Spectre mitigation for 4.15 and beyond", Jan. 15, 2018, 15 pages.

Extended European Search Report and Search Opinion, EP App. No. 20165127.0, dated Nov. 19, 2020, 9 pages.
Fustos et al., "SpectreGuard: An Efficient Data-centric Defense Mechanism against Spectre Attacks", DAC '19: Proceedings of the 56th Annual Design Automation Conference, Jun. 2019, 6 pages.
Intel, "Speculative Execution Side Channel Mitigations," Revision 3.0, May 2018, 23 pages.
Khasawneh et al., "SafeSpec: Banishing the Spectre of a Meltdown with Leakage-Free Speculation", 56th ACM/IEEE Design Automation Conference (DAC), Jun. 2019, 6 pages.
Li et al., "Conditional Speculation: An Effective Approach to Safeguard Out-of-Order Execution Against Spectre Attacks", IEEE International Symposium on High Performance Computer Architecture (HPCA), Feb. 2019, pp. 264-276.
Linton et al., "More details about mitigations for the CPU Speculative Execution issue", Jan. 4, 2018, 5 pages.
Sakalis et al., "Efficient Invisible Speculative Execution through Selective Delay and Value Prediction", ACM/IEEE 46th Annual International Symposium on Computer Architecture (ISCA), Jun. 2019, pp. 723-735.
Weisse et al., "NDA: Preventing Speculative Execution Attacks at Their Source", MICRO '52: Proceedings of the 52nd Annual IEEE/ACM International Symposium on Microarchitecture, Oct. 2019, 15 pages.
Yan et al., "InvisiSpec: Making Speculative Execution Invisible in the Cache Hierarchy", 51st Annual IEEE/ACM International Symposium on Microarchitecture (MICRO), Oct. 2018, 14 pages.
Yu et al., "Speculative Taint Tracking (STT): A Comprehensive Protection for Speculatively Accessed Data", IEEE Computer Society, May/Jun. 2020, pp. 81-90.
Yu et al., "Speculative Taint Tracking (STT): A Comprehensive Protection for Speculatively Accessed Data", MICRO '52: Proceedings of the 52nd Annual IEEE/ACM International Symposium on Microarchitecture, Oct. 2019, pp. 954-968.
Non-Final Office Action, U.S. Appl. No. 16/728,815, dated Dec. 21, 2021, 19 pages.
Decision to grant a European patent, EP App. No. 20155110.8, dated Aug. 19, 2022, 2 pages.
Final Office Action, U.S. Appl. No. 16/458,006, dated Oct. 27, 2022, 10 pages.
Final Office Action, U.S. Appl. No. 16/728,815, dated May 19, 2022, 21 pages.
Intention to grant, EP App. No. 20155110.8, dated Apr. 20, 2022, 7 pages.
Non-Final Office Action, U.S. Appl. No. 16/458,006, dated Apr. 19, 2022, 8 pages.
Ralf Hund; Practical Timing Side Channel Attacks Against Kernel Space ASLR; IEEE:2013; p. 191-205.

\* cited by examiner

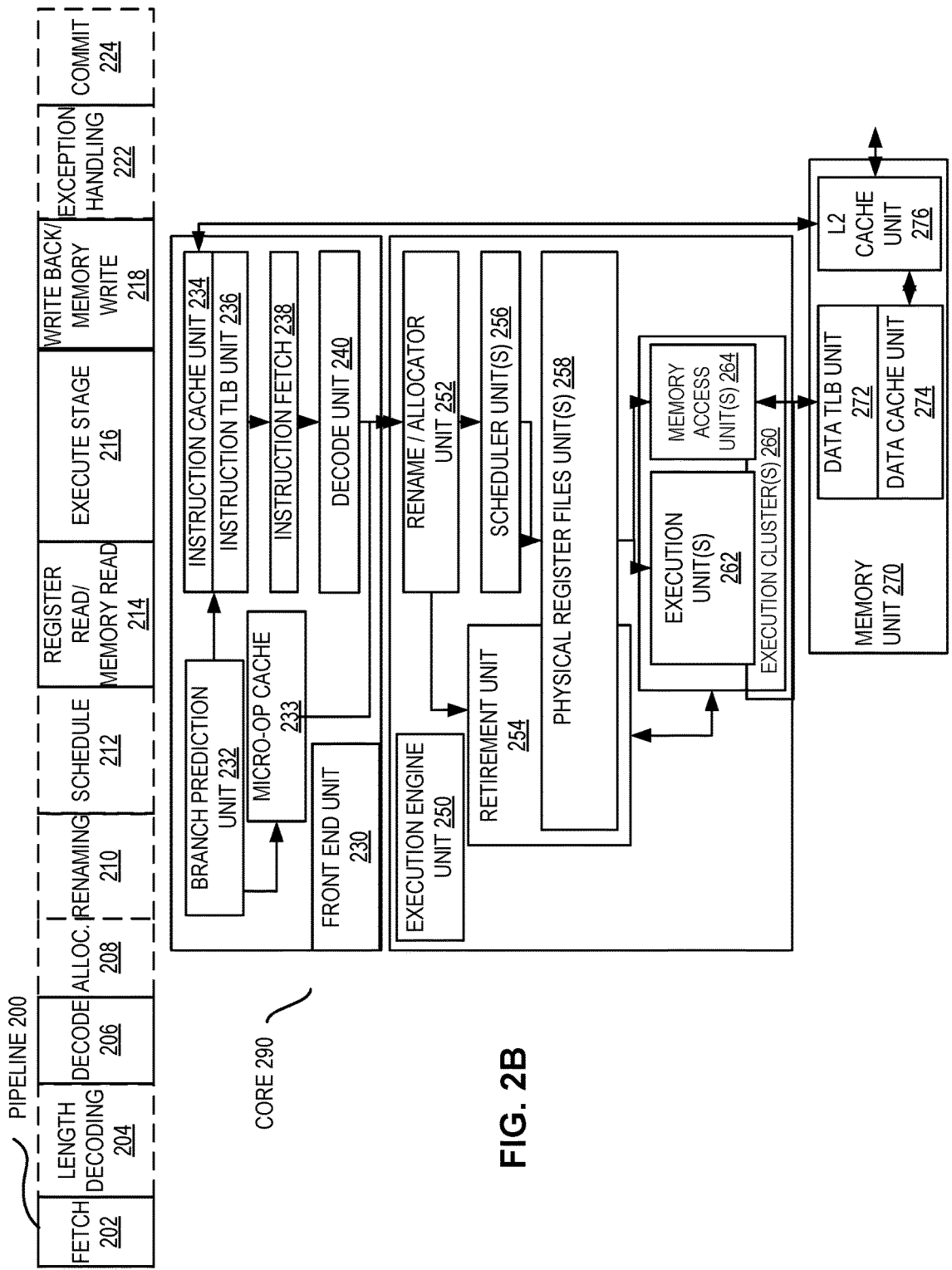

RESTRICTED SPECULATIVE EXECUTION MODE TO PREVENT OBSERVABLE SIDE EFFECTS

FIELD OF THE INVENTION

The field of invention relates generally to computers, and, more specifically, to computer system security.

BACKGROUND

Computer systems may be vulnerable to attempts by adversaries to obtain confidential, private, or secret confidential information. For example, attacks, such as Spectre and Meltdown, exploit speculative and out-of-order execution capabilities of processors to illicitly read data through side-channel analysis.

BRIEF DESCRIPTION OF THE DRAWINGS

The present invention is illustrated by way of example and not limitation in the figures of the accompanying drawings, in which like references indicate similar elements and in which:

FIG. 2A is a block diagram illustrating both an exemplary in-order pipeline and an exemplary register renaming, out-of-order issue/execution pipeline according to embodiments of the invention;

FIG. 2B is a block diagram illustrating both an exemplary embodiment of an in-order architecture core and an exemplary register renaming, out-of-order issue/execution architecture core to be included in a processor according to embodiments of the invention;

FIG. 4 shows a block diagram of a system in accordance with one embodiment of the present invention;

FIG. 5 is a block diagram of a first more specific exemplary system in accordance with an embodiment of the present invention;

FIG. 6 is a block diagram of a second more specific exemplary system in accordance with an embodiment of the present invention;

FIG. 7 is a block diagram of a system-on-chip (SoC) in accordance with an embodiment of the present invention;

DETAILED DESCRIPTION

Figure 1A:
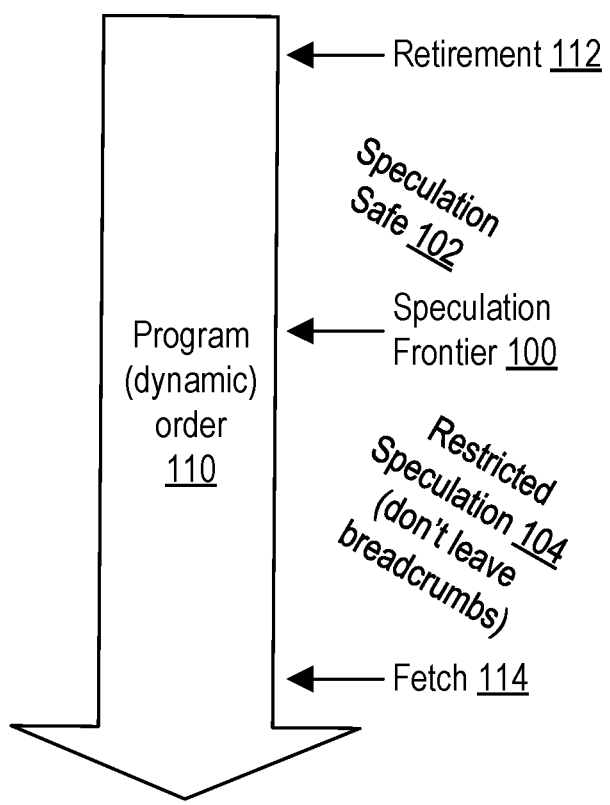
FIG. 1A illustrates a speculation frontier according to an embodiment of the invention.

In the following description, numerous specific details are set forth. However, it is to be understood that embodiments of the invention may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular structure, feature, or characteristic, but every embodiment may not necessarily include the particular structure, feature, or characteristic. Moreover, such phrases are not necessarily referring to the same embodiment. Further, when a feature, structure, or characteristic is described in connection with an embodiment, it is submitted that it is within the knowledge of one skilled in the art to affect such feature, structure, or characteristic in connection with other embodiments whether or not explicitly described.

Many processors and processor cores support capabilities to increase performance, such as caching, multithreading, out-of-order execution, branch prediction, and speculative execution. Adversaries have found ways to exploit capabilities of these processors to illicitly read data.

For example, an adversary might intentionally attempt to read data (e.g., secret data) from a memory location that should not be readable by it (e.g., out-of-bounds). The read might be allowed to proceed speculatively until it is determined whether the access is out-of-bounds. The architectural correctness of the system might be ensured by not committing any results until the determination is made, but the speculative execution might cause the microarchitectural state of the processor to change before the determination is made, and the adversary might be able to perform side-channel analysis to infer the value of the secret data from differences in the microarchitectural state of the processor. Many variants of this type of speculative attacks are possible. In one scenario, the adversary might speculatively use the secret data as part of a memory address, and, using a timing analysis to determine what memory locations are being loaded into a cache, infer the value.

Embodiments of the invention include systems, methods, and apparatuses providing features or characteristics that may be desirable for use in a variety of computer systems for a variety of reasons, including to reduce vulnerability to attacks based on speculation, side-channel analysis, etc.; to reduce vulnerability to such analysis with less cost, in performance or otherwise, than an alternative approach; and/or to improve security in general. Embodiments may reduce vulnerability to attacks that use branch prediction speculation, data prediction speculation, store-forwarding (memory disambiguation) predictions, return-stack-buffer (RSB) predictions, etc. Embodiments may provide a mode of a processor (to be referred to in this description as restricted speculative execution mode or RSE) in which speculative execution may be restricted.

RSE is a new execution mode, which software may opt-in to or opt-out from dynamically. This mode may provide protection against or mitigation of persistent side effects left following speculative execution, which may be observable and abused by practical known attacks such as those listed above.

RSE mode may move the burden of protecting against persistent speculative side-channel attacks from software to hardware and may be optimized to improve its performance or add new capabilities to protect against new attacks or against persistent side effects due to new hardware or features. Future improvements to this mode may be made without requiring any software changes.

RSE mode includes hardware mitigations that may come with a performance loss. The performance loss should happen only when RSE is turned on. When RSE is off, performance should not be affected. Mitigations that have no performance cost (e.g., in instruction per cycle or power) should be always turned on (e.g., no speculation or value speculative propagation following permission faults).

RSE mode may be used to protect against or mitigate observable persistent side-effects on a speculated wrong path, which can be used in known practical attacks. RSE mode may be used to prevent side effects in caches and other structures for control speculation (e.g., wrong path due to branch prediction) and data speculation (e.g., wrong path due to missed memory disambiguation (MD)).

The speculation that RSE mode deals with may be stricter than the general definition of speculation (which would include, for example, faults and events). A limited definition of speculation may provide greater practicality and performance. Forms of speculation outside the scope of RSE may be dealt with through other means (e.g., hardware solutions for faults or operating system scheduling policies for cross thread interactions).

RSE mode may be defined such that it does not protect against side effects on cross threads memory ordering speculation (snoops); transient side effects or non-speculative side-channel (e.g., side effects observable through a neighbor simultaneous multi-threading thread while a code is running such as port contention and bank contention on DCU; software may do friendly thread scheduling to mitigate such attacks); and wrong path due to a fault, exception, or interrupt. Relevant wrong path cases due to faults/exceptions that can be used for practical attacks may be mitigated in the baseline hardware (regardless of RSE mode). Such mitigation should not come with a performance cost and should be always on. This includes load/store permission faults (hardware blocks the speculation of dependent operations based on load faults regardless of RSE mode).

Referring to the Figures to be described below, any or each of core 290 in FIG. 2, processor 300 or cores 302A through 302N in FIG. 3, processors 410 through 415 in FIG. 4, processors 570 and 580 in FIGS. 5 and 6, processor 710 or cores 302A through 302N in FIG. 7, and any other processor or processor core (any of which may be referred to as a processor) may include any of the features and/or characteristics described in this specification to support an RSE mode.

A processor may provide a software interface and architectural definition through which an RSE mode may be controlled.

In an embodiment, RSE capability may be enumerated through the use of a processor identification and feature enumeration instruction (e.g., CPUID).

In an embodiment, RSE mode may be controlled through model-specific register (MSR) bits that would give software the ability to control whether RSE is on. This model specific register may also be controllable according to the privilege level, e.g. control whether RSE is on while in supervisor mode (OS/kernel), and whether it is on while in user mode. In an embodiment, two new bits may defined in a hardware thread scope MSR (e.g., IA32_SPEC_CTRL_MSR). A first bit (e.g., IA32_SPEC_CTRL.RSE_S) may control RSE when in supervisor mode (e.g., when the current privilege level (CPL) is less than three). This bit may be set to enable RSE while the processor is running in supervisor mode. A second bit (e.g., IA32_SPEC_CTRL.RSE_U) may control RSE when in user mode (e.g., CPL=3). This bit may be set to enable RSE while the processor is running in user mode.

The OS may provide an interface for turning on user mode RSE. If user mode RSE should be tied to a context (software thread), then the OS may save and restore IA32_SPEC_CTRL.RSE_U as part of the context. Alternatively, the OS may use EFLAGS.RSE as described below.

In an embodiment, a new or existing (e.g., EFLAGS) status and control register may include a new flag bit (e.g., EFLAGS.RSE) to provide for fine-grained software control. RSE may be on (enabled) when turned on through the new bit or flag in EFLAGS or through the relevant MSR bit (according to the current privilege level). In an embodiment, RSE is on (enabled) when (EFLAGS.RSE=1) OR (CPL=3 ? IA32_SPEC_CTRL.RSE_U: IA32_SPEC_CTRL.RSE_S).

EFLAGS.RSE may be used by user level software for fine-grained control over RSE and a fast way to turn RSE mode on or off. The EFLAGS manipulation may be significantly faster than invoking the OS for an MSR write operation (e.g., to IA32_SPEC_CTRL_MSR). EFLAGS.RSE may be useful for user level software when IA32_SPEC_CTRL.RSE_U=0.

Supervisor software (e.g., OS) may use either the IA32_SPEC_CTRL.RSE_S for fine grained control or EFLAGS.RSE. In an embodiment, an OS that wants to always run with RSE enabled may set IA32_SPEC_CTRL.RSE_S (e.g., to 1). Otherwise, the OS may reset EFLAGS.RSE (e.g., to 0) on entry to supervisor mode. Not doing may allow EFLAGS.RSE from user mode software to affect supervisor mode execution (performance) by turning RSE on for supervisor. If supervisor software uses EFLAGS.RSE instead of IA32_SPEC_CTRL.RSE_S, then it should setup EFLAGS.RSE to the required value on any entry to supervisor mode.

A first new instruction (e.g., STRSE) may set the RSE flag in the EFLAGS register. Other flags should not be affected. The operation is the same in all modes. A second new instruction (e.g., CLRSE) may clear the RSE flag in the EFLAGS register. Other flags should not be affected. The operation is the same in all modes.

In embodiments, RSE mode may be used in connection with a virtualization environment. For example, in connection with migrating a virtual machine, a virtual machine monitor may scrub the EFLAGS.RSE bit when migrating to a processor that does not support and RSE mode.

The operation of a processor in an RSE mode may provide for the processor to restrict speculative execution such that it executes as fast as possible while not leaving persistent side-effects on the wrong path that can be used by practical attacks. The restrictions allow for speculative execution, but without leaving exploitable side effects, to minimize the performance impact of the restrictions.

While in RSE mode, each operation (e.g., branch, load, or store) may be restricted. An operation is restricted when it may be on the wrong path of some prediction mechanism (e.g., branch predictor or memory-disambiguation). It is not restricted when it is known to be on the correct path. RSE mode splits the execution of restricted operations into a first part that is required for forward progress and a second part that may be required for performance. For example, a load operation needs its data for forward progress, but filling it to the cache or updating the LRU is only required for performance. If the first part (required for forward progress) of a restricted operation does not leave persistent observable side effects, then it is executed, and the second part is either delayed or dropped. If the first part (required for forward progress) leaves persistent observable side effects, then that operation is delayed until it becomes non-restricted or until it can be done without leaving side effects. Persistent observable side effects are changes of the state of the microarchitecture that remain after the speculation window closes and are software observable (e.g., effects that can be measured via software methods).

The following description is of an embodiment of a micro-architectural operation of an RSE mode with respect to out-of-order (OOO) operation, for example in an Intel® Core™ processor.

RSE mode may consist of two elements: (1) definition of the time interval during which an operation is restricted and (2) definition of what an operation (e.g., a load) is allowed to do while it is restricted and what it should not do. The time interval during which an operation is restricted is defined based on the time interval in which an operation (e.g., a load) may be on a wrong speculative execution path (a speculative execution that was not supposed to happen). What an operation is allowed to do while it is restricted and what it should not do is defined such that operations should not leave persistent side effects while they are restricted.

An operation (e.g., load, store, or branch) may be restricted when it may be on a wrong speculative path, which may be in respect to multiple speculation (prediction) mechanisms in an OOO processor. The time interval during which an operation is restricted may be based on the concept of a speculation frontier, as described below.

FIG. 1A illustrates a speculation frontier 100 according to an embodiment of the invention. A speculation frontier may be defined to separate the speculative operations (instructions/micro-operations), which may be on the wrong path, from those known to be on the correct path. A speculation frontier may be defined per prediction mechanism. Program-order perspective 110 represents an order of operations in which, for any two operations, the operation closer to retirement 112 is considered to be older than the operation closer to fetch 114. Any operation that is older than the speculation frontier (e.g., in interval 102) is considered to be not-restricted. Operations younger than the speculation frontier (e.g., in interval 104) may be on the wrong path and should not be allowed to leave permanent observable side effects ("breadcrumbs"). The speculation frontier is dynamic and changes (moves forward) as execution progresses. In other words, an operation may be restricted for some time until it becomes not-restricted.

In an embodiment, an operation is restricted with respect to branch prediction when an older branch exists that has not been resolved yet (executed) or an older branch was resolved to be mis-predicted. An operation is not restricted with respect to branch prediction when all older branches have been resolved and were found to be correctly predicted. Such operations are known to be on the correct path (with respect to branch prediction).

In an embodiment involving missed store forwarding, a memory disambiguation (MD) predictor predicts when a load does not need data from an older store, and hence can execute before all older stores have resolved their address. If the MD predictor makes a mistake, the pipeline must be cleared (since we have instructions that operate on wrong data). An operation (load, store, or branch) is restricted with respect to MD when an older store exists that has not resolved its address yet. An operation for which all older stores have already resolved their address is known to use the correct data from MD perspective, and is not restricted with respect to MD. When missed store forwarding to load is detected (MD predictor mistake), all younger operations should be restricted.

In embodiments, RSE mode includes a definition of what an operation may do while it is restricted. Embodiments involving load operations, store operations, prefetching operations, and macro-branch operation are described below, but other embodiments involving these and other operations are possible.

Load operations may be restricted to prevent them from leaving persistent observable side effects. This means that while a load is restricted it should not cause any change in any cache (e.g., according to a least-recently-used (LRU) or other replacement policy). A restricted load that hits a cache (a level one (L1) data cache, a data translation lookaside buffer (DTLB), etc.) should not change the LRU. A value from a cache can be used for forward progress. A restricted load that misses a cache (an L1 data cache, a DTLB, etc.) should either be blocked until it becomes not-restricted, or lookup the next level cache as long as it does not leave any persistent side effects on any level of the cache (see "restricted load that hits a cache" above; if the value is retrieved from the next level it should not be filled back to the cache).

In an embodiment, an implementation of a restricted load operation may allow a hit in a data cache unit (DCU) and DTLB while disabling LRU updates or any other side effects. A miss in the DCU will be blocked until the load is not restricted. A miss in the DTLB will be looked up in a second level TLB (STLB). On hit in the STLB the STLB translation can be used, no LRU will be updated and the translation will not be filled back into the DTLB. If missed in the STLB, the load will be blocked until it is not restricted. Any part of the operation that is not done while the operation is restricted may be delayed to the time that the operation is no longer restricted.

Store operations may be restricted to prevent them from leaving persistent observable side effects when executed on the wrong path. In an embodiment, an STA (store address micro-operation) that looks up the DTLB may be restricted by allowing hits in the DTLB while disabling LRU updates or any other side effects and providing for misses in the DTLB to be looked up in the STLB. On a hit in the STLB, the translation may be used by the STA, no LRU will be updated and the translation will not be filled back into the DTLB. On a miss in the STLB, the STA will be blocked until it is not restricted. In an embodiment, an STD (store data micro-operation) is always not restricted because it is executed post-retirement, and hence does not execute on the wrong path. In an embodiment, a performance optimization (STA-prefetch) may trigger a request to bring the physical address used by the store into the cache as a prefetch, as soon as the physical address for the store is resolved. In an embodiment, an STA-prefetch would not be issued when a store is restricted. It may either be dropped or queued for a later dispatch (when the store is no longer restricted).

Prefetch operations may be restricted by preventing them from training any hardware prefetchers or trigger prefetching actions.

Macro-branch operation may be restricted such that the execution of a restricted branch (a branch that is younger than the speculation frontier, i.e., may be on the wrong path) should not leave persistent side effects. Potential side effects of macro-branches include branch prediction unit (BPU) training (positive or negative) and instruction fetch unit (IFU) re-steering for mis-predicted branches. IFU cache side effects for predicted branches are not considered exploitable side effects as long as they are not based on values on the wrong path (and hence cannot be used to reveal secrets by an attacker). In an embodiment, restricted macro-branches will not send positive updates (confidence increase) when they are correctly predicted. When they are mis-predicted, the micro-architecture will do IFU re-steering and negative BPU updates only for the oldest mis-predicted branch when it becomes non-restricted. In other words, any BPU negative or positive training on the wrong path is prevented (or delayed).

Figure 1B:
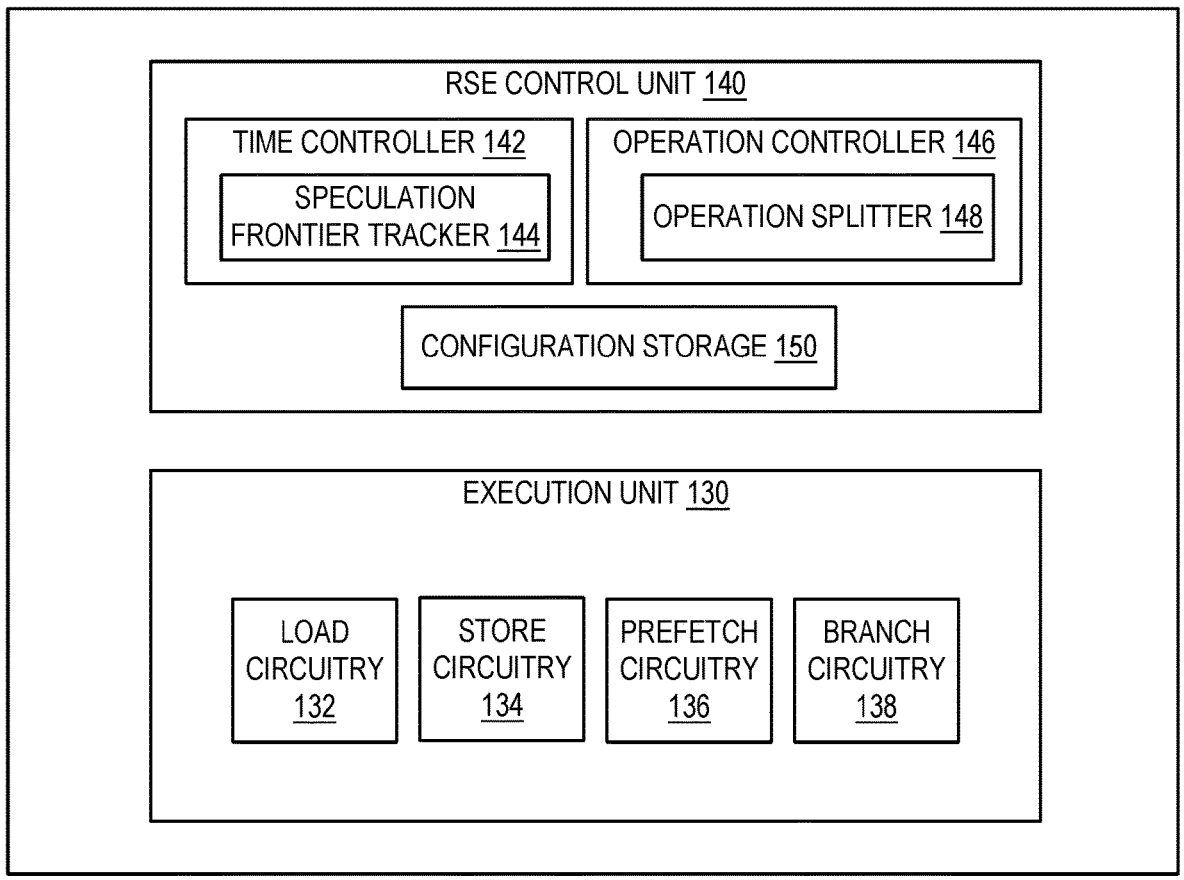
FIG. 1B is a block diagram of a processor including support for a restricted speculative execution mode according to an embodiment of the invention.

FIG. 1B is a block diagram of a processor 120 including support for an RSE mode according to an embodiment of the invention. Processor 120 may correspond to any or each of core 290 in FIG. 2, processor 300 or cores 302A through 302N in FIG. 3, processors 410 through 415 in FIG. 4, processors 570 and 580 in FIGS. 5 and 6, processor 710 or cores 302A through 302N in FIG. 7, and any other processor or processor core in which the invention may be embodied.

Processor 120 includes execution unit 130 which may include circuitry operable in a first mode and a second mode, the first mode being any mode of operation in which speculative execution is not restricted according to an embodiment of the invention, and the second mode (RSE mode) being any mode of operation in which speculative execution may be restricted according to an embodiment of the invention. Though referred to for convenience as an execution unit, execution unit 130 may include any circuitry anywhere in a processor (in a front-end unit, an execution unit, a memory unit, etc.) that operates in connection with the execution of instructions by the processor. For example, execution unit 130 is shown as including load circuitry 132, store circuitry 134, prefetch circuitry 138, and branch circuitry 140, each of which may operate, when in RSE mode, according to the corresponding descriptions above. Execution unit 130 may also include any other circuitry corresponding to any other operations that may be performed in an RSE mode according to an embodiment of the invention.

Processor 120 also includes RSE control unit 140, which may include any type of control logic (microcode, firmware, state machine, hardware, etc.) with which execution unit 130 may be controlled. RSE control unit 140 is shown as including time controller 142 and operation controller 146, each of which may represent any number of distinct controllers to control any number of different operations. Time controller 142 may control when an operation is restricted according to the description above, and, as such may include speculation frontier tracker 144, which may represent any one or more trackers to track the speculation frontier within a group of instructions, as described above. Operation controller 146 may control how an operation is restricted, for example, as described above for various operations, but not limited to the above operations or descriptions. Operation controller 146 may include operation splitter 148, which may split operations into a first part that is required for forward progress and a second part that is desired for performance, and may allow the first part to proceed if it does not leave persistent observable side effects. RSE control unit 140 may also include configuration storage 150 which may include any registers or other storage (e.g., IA32_SPEC_CTRL_MSR, EFLAGS.RSE) that may be configured or programmed to enable, use, and/or control RSE mode, such as according to the description of the software interface described above.

Figure 1C:
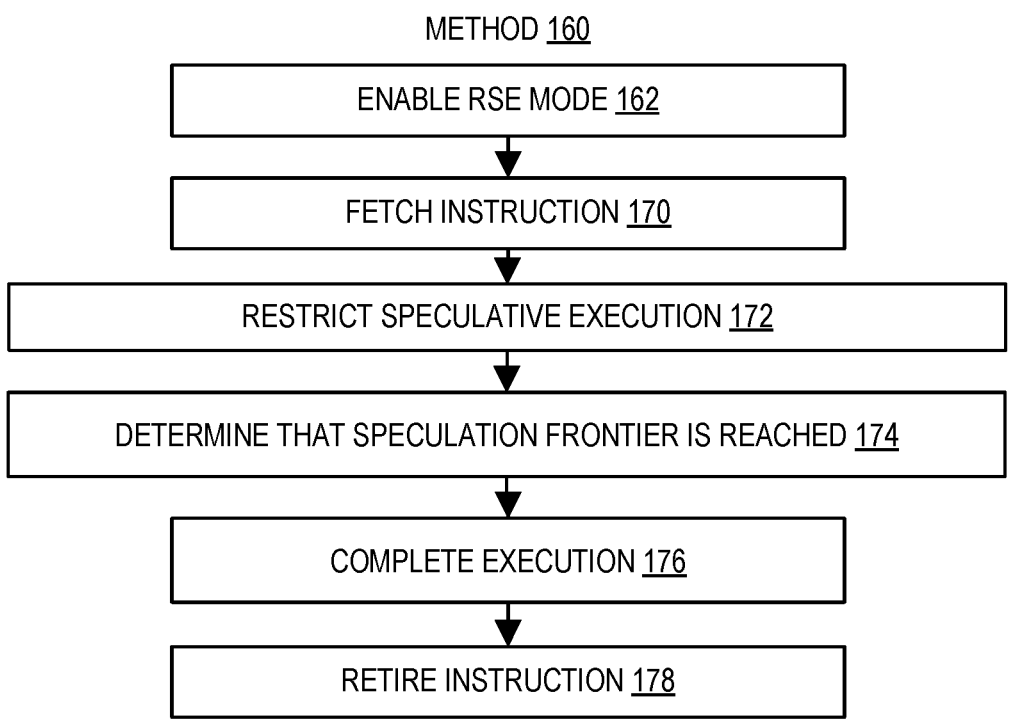
FIG. 1C is a flow diagram of a method of performing restricted speculative execution according to an embodiment of the invention.

FIG. 1C is a flow diagram of a method 160 of performing restricted speculative execution according to an embodiment of the invention. In box 162, an RSE mode of a processor is enabled, as described above. In box 170, an instruction is fetched. In box 172, an operation related to speculative execution of the instruction is restricted, for example by operation controller 146 and/or as otherwise described above, to prevent the operation from leaving persistent observable or otherwise exploitable side effects. In box 174, it is determined, for example by time controller 142 and/or as otherwise described above, that a speculation frontier has been reached with respect to the operation. In box 176, the operation is completed (i.e., performed and/or continued without the restriction(s) imposed in box 162). In box 178, the instruction is retired. It should be noted that if an operation was determined to be on the wrong path than its speculation frontier 176 will not be reached and it will be eventually cleared from the processor (flushed).

In an embodiment, a processor may include configuration storage, an execution circuit, and a controller. The configuration storage is to store an indicator to enable a restricted speculative execution mode of operation of the processor, wherein the processor is to restrict speculative execution when operating in restricted speculative execution mode. The execution circuit is to perform speculative execution. The controller to restrict speculative execution by the execution circuit when the restricted speculative execution mode is enabled.

Speculative execution may be restricted to prevent the speculative execution from leaving persistent observable side effects. The controller may be to split an operation related to the speculative execution into a first part for forward progress and a second part for performance. The first part may be allowed to proceed if it does not leave persistent observable side effects. The second part may be delayed or dropped. The controller may be to determine that a speculation frontier is reached. The controller may be to restrict the speculative execution until the speculation frontier is reached. The controller may be to allow the speculative execution after the speculation frontier is reached. Restricting speculative execution may include restricting a load operation. The processor may include a cache, and restricting the load operation may include using a value from the cache but disabling a cache replacement update. Restricting speculative execution may include restricting a store operation. The processor may include a TLB, and restricting the store operation may include using an address from the TLB but disabling a TLB replacement update. Restricting speculative execution may include restricting a prefetch operation. The processor may include a hardware prefetcher, and restricting the prefetch operation may include preventing training of the hardware prefetcher based on the prefetch operation. Restricting speculative execution may include restricting a branch operation. The processor may include a BPU or an IFU, and restricting the branch operation may include preventing training of the BPU or re-steering of the IFU based on the branch operation.

In an embodiment, a method may include enabling a restricted speculative execution mode of operation of the processor, wherein the processor is to restrict speculative execution when operating in restricted speculative execution mode; fetching an instruction for execution by the processor; and restricting speculative execution of an operation related to the instruction when the restricted speculative execution mode is enabled. The method may also include determining that a speculation frontier has been reached with respect to the operation; and completing the operation.

In an embodiment, a system may include a system memory and a processor as described above. Speculative execution may be restricted to prevent the speculative execution from leaving persistent observable side effects in the system.

In an embodiment, an apparatus may include configuration means for storing an indicator to enable a restricted speculative execution mode of operation of the processor, wherein the apparatus is to restrict speculative execution when operating in restricted speculative execution mode;

execution means for performing speculative execution; and control means for restricting speculative execution by the execution means when the restricted speculative execution mode is enabled.

Speculative execution may be restricted to prevent the speculative execution from leaving persistent observable side effects. The control means may also be for splitting an operation related to the speculative execution into a first part for forward progress and a second part for performance. The first part may be allowed to proceed if it does not leave persistent observable side effects. The second part may be delayed or dropped. The control means may also be for determining that a speculation frontier is reached. The control means may also be for restricting the speculative execution until the speculation frontier is reached. The control means may also be for allowing the speculative execution after the speculation frontier is reached. Restricting speculative execution may include restricting a load operation. The apparatus may also include a cache, and restricting the load operation may include using a value from the cache but disabling a cache replacement update. Restricting speculative execution may include restricting a store operation. The apparatus may also include a TLB, and restricting the store operation may include using an address from the TLB but disabling a TLB replacement update. Restricting speculative execution may include restricting a prefetch operation. The apparatus may also include a hardware prefetcher, and restricting the prefetch operation may include preventing training of the hardware prefetcher based on the prefetch operation. Restricting speculative execution may include restricting a branch operation. The apparatus may also include a BPU or an IFU, and restricting the branch operation may include preventing training of the BPU or re-steering of the IFU based on the branch operation.

In an embodiment, an apparatus may comprise a data storage device that stores code that when executed by a hardware processor causes the hardware processor to perform any method disclosed herein. An apparatus may be as described in the detailed description. A method may be as described in the detailed description.

In an embodiment, a non-transitory machine-readable medium may store code that when executed by a machine causes the machine to perform a method comprising any method disclosed herein.

Exemplary Core, Processor, and System Architectures

Embodiments of the invention have been described and depicted with reference to a processor, which may represent any of many different processors in which the invention is embodied in different ways and/or for different purposes. These processors and cores, for example as described below, may include hardware, such as caches and branch predictors, that improve performance but may make the processor and/or core more vulnerable to analysis that may be defended against according to embodiments of the invention.

For instance, implementations of cores in a processor in which the invention may be embodied may include: a general purpose in-order core intended for general-purpose computing; a high-performance general purpose out-of-order core intended for general-purpose computing; a special purpose core intended primarily for graphics and/or scientific (throughput) computing. Implementations of processors in which the invention may be embodied may include: a central processing unit (CPU) including one or more general purpose in-order cores intended for general-purpose computing and/or one or more general purpose out-of-order cores intended for general-purpose computing; and a coprocessor including one or more special purpose cores intended primarily for graphics and/or scientific (throughput) computing. Such different processors lead to different computer system architectures, which may include: the coprocessor on a separate chip from the CPU; the coprocessor on a separate die in the same package as a CPU; the coprocessor on the same die as a CPU (in which case, such a coprocessor is sometimes referred to as special purpose logic, such as integrated graphics and/or scientific (throughput) logic, or as special purpose cores); and a system on a chip (SoC) that may include on the same die the described CPU (sometimes referred to as the application core(s) or application processor(s)), the above described coprocessor, and additional functionality.

Exemplary core architectures are described next, followed by descriptions of exemplary processors and computer architectures. Each processor may include one or more cores, where each core and/or combination of cores may be architected and designed to execute one or more threads, processes, or other sequences of instructions at various times. Core architectures and design techniques may provide for and/or support the concurrent execution of multiple threads, according to any of a type of approaches known as simultaneous (or symmetric) multi-threading (SMT) or any other approach.

Further, as mentioned above and explained in more detail below, embodiments of the present disclosure may apply to any type of processor or processing element, including general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor or processors may be implemented on one or more chips. The processor or processors may be a part of and/or may be implemented on one or more substrates using any of a number of process technologies, such as, for example, BiCMOS, CMOS, or NMOS. The processors and processing devices listed above and described herein are exemplary; as explained herein, the present disclosure is applicable to any processor or processing device.

Further, as mentioned above and explained in more detail below, embodiments of the present disclosure may apply to processors or processing elements using a wide variety of instruction sets and instruction set architectures, including for example, the x86 instruction set (optionally including extensions that have been added with newer versions); the MIPS instruction set of MIPS Technologies of Sunnyvale, Calif.; the ARM instruction set (with optional additional extensions such as NEON) of ARM Holdings of Sunnyvale, Calif.; IBM's "Power" instruction set, or any other instruction set, including both RISC and CISC instruction sets. The instruction sets and instruction set architectures listed above and described herein are exemplary; as explained herein, the present disclosure is applicable to any instruction set or instruction set architecture.

Exemplary Core Architecture

FIG. 2A is a block diagram illustrating both an exemplary in-order pipeline and an exemplary register renaming, out-of-order issue/execution pipeline according to embodiments of the invention. FIG. 2B is a block diagram illustrating both an exemplary embodiment of an in-order architecture core and an exemplary register renaming, out-of-order issue/ execution architecture core to be included in a processor according to embodiments of the invention. The solid lined boxes in FIGS. 2A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 2A, a processor pipeline 200 includes a fetch stage 202, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224.

FIG. 2B shows processor core 290 including a front-end unit 230 coupled to an execution engine unit 250, and both are coupled to a memory unit 270. The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, coprocessor core, general purpose computing graphics processing unit (GPGPU) core, graphics core, or the like. For example, as explained above, core 290 may be any member of a set containing: general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device.

The front-end unit 230 includes a branch prediction unit 232 coupled to a micro-op cache 233 and an instruction cache unit 234, which is coupled to an instruction translation lookaside buffer (TLB) 236, which is coupled to an instruction fetch unit 238, which is coupled to a decode unit 240. The decode unit 240 (or decoder) may decode instructions, and generate as an output one or more micro-operations, micro-code entry points, microinstructions, other instructions, or other control signals, which are decoded from, or which otherwise reflect, or are derived from, the original instructions. The micro-operations, micro-code entry points, microinstructions, etc. may be stored in at least the micro-op cache 233. The decode unit 240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 290 includes a microcode ROM or other medium that stores microcode for certain macroinstructions (e.g., in decode unit 240 or otherwise within the front-end unit 230). The micro-op cache 1233 and the decode unit 240 are coupled to a rename/allocator unit 252 in the execution engine unit 250. In various embodiments, a micro-op cache such as 233 may also or instead be referred to as an op-cache, u-op cache, uop-cache, or µop-cache; and micro-operations may be referred to as micro-ops, u-ops, uops, and µops.

The execution engine unit 250 includes the rename/ allocator unit 252 coupled to a retirement unit 254 and a set of one or more scheduler unit(s) 256. The scheduler unit(s) 256 represents any number of different schedulers, including reservations stations, central instruction window, etc. The scheduler unit(s) 256 is coupled to the physical register file(s) unit(s) 258. Each of the physical register file(s) units 258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 258 comprises a vector registers unit, a write mask registers unit, and a scalar registers unit. These register units may provide architectural vector registers, vector mask registers, and general purpose registers. The physical register file(s) unit(s) 258 is overlapped by the retirement unit 254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 254 and the physical register file(s) unit(s) 258 are coupled to the execution cluster(s) 260. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The instruction cache unit 234 is further coupled to a level 2 (L2) cache unit 276 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 238 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif., IBM's "Power" instruction set, or any other instruction set, including both RISC and CISC instruction sets), including the instruction(s) described herein. In one embodiment, the core 290 includes logic to support a packed data instruction set extension (e.g., AVX, AVX2, AVX-512), thereby allowing the operations used by many multimedia applications to be performed using packed data.

It should be understood that the core may support multithreading (executing two or more parallel sets of operations or threads), and may do so in a variety of ways including time sliced multithreading, SMT (e.g., a single physical core provides a logical core for each of the threads that physical core is simultaneously multithreading), or a combination thereof (e.g., time sliced fetching and decoding, and SMT thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache(s) may be external to the core and/or the processor.

Exemplary Processor Architectures

Figure 3:
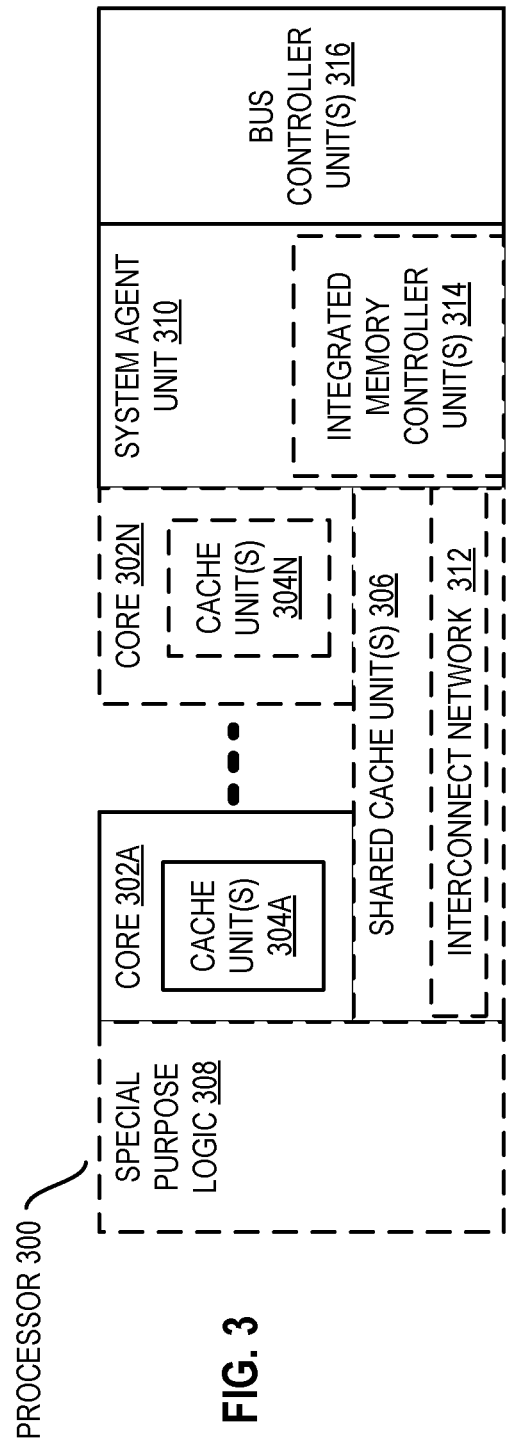
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); 3) a coprocessor with the cores 302A-N being a large number of general purpose in-order cores; and 4) the cores 302A-N representing any number of disaggregated cores with a separate input/output (I/O) block. Thus, the processor 300 may be a general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring-based interconnect unit 312 interconnects the integrated graphics logic 308 (integrated graphics logic 308 is an example of and is also referred to herein as special purpose logic), the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multi-threading. The system agent 310 includes those components coordinating and operating cores 302A-N. The system agent unit 310 may include for example a power control unit (PCU) and a display unit. The PCU may be or include logic and components needed for regulating the power state of the cores 302A-N and the integrated graphics logic 308. The display unit is for driving one or more externally connected displays.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

Exemplary Computer Architectures

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), general-purpose processors, server processors or processing elements for use in a server-environment, coprocessors (e.g., security coprocessors) high-throughput MIC processors, GPGPU's, accelerators (such as, e.g., graphics accelerators, cryptographic accelerators, fixed function accelerators, machine learning accelerators, networking accelerators, or computer vision accelerators), field programmable gate arrays, or any other processor or processing device, graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
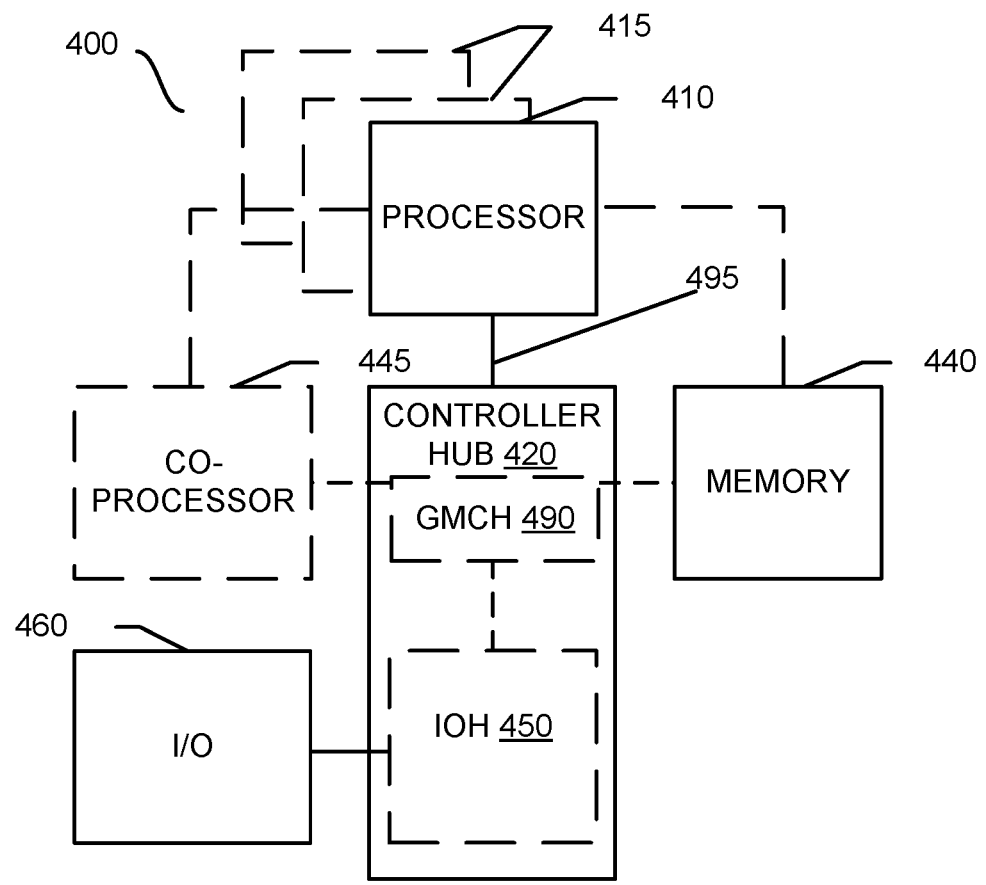
FIGS. 4-7 are block diagrams of exemplary computer architectures.

Referring now to FIG. 4, shown is a block diagram of a system 400 in accordance with one embodiment of the present invention. The system 400 may include one or more processors 410, 415, which are coupled to a controller hub 420. In one embodiment, the controller hub 420 includes a graphics memory controller hub (GMCH) 490 and an Input/ Output Hub (IOH) 450 (which may be on separate chips); the GMCH 490 includes memory and graphics controllers to which are coupled memory 440 and a coprocessor 445; the IOH 450 couples I/O devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random-access memory (DRAM), phase change memory (PCM), or a combination of the two. For at least one embodiment, the controller hub 420 communicates with the processor(s) 410, 415 via a multi-drop bus, such as a front-side bus (FSB), point-to-point interface such as QuickPath Interconnect (QPI), or similar connection 495.

In one embodiment, the coprocessor 445 is a special-purpose processor (including, e.g., general-purpose processors, server processors or processing elements for use in a server-environment, coprocessors such as security coprocessors, high-throughput MIC processors, GPGPU's, accelerators, such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device). In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
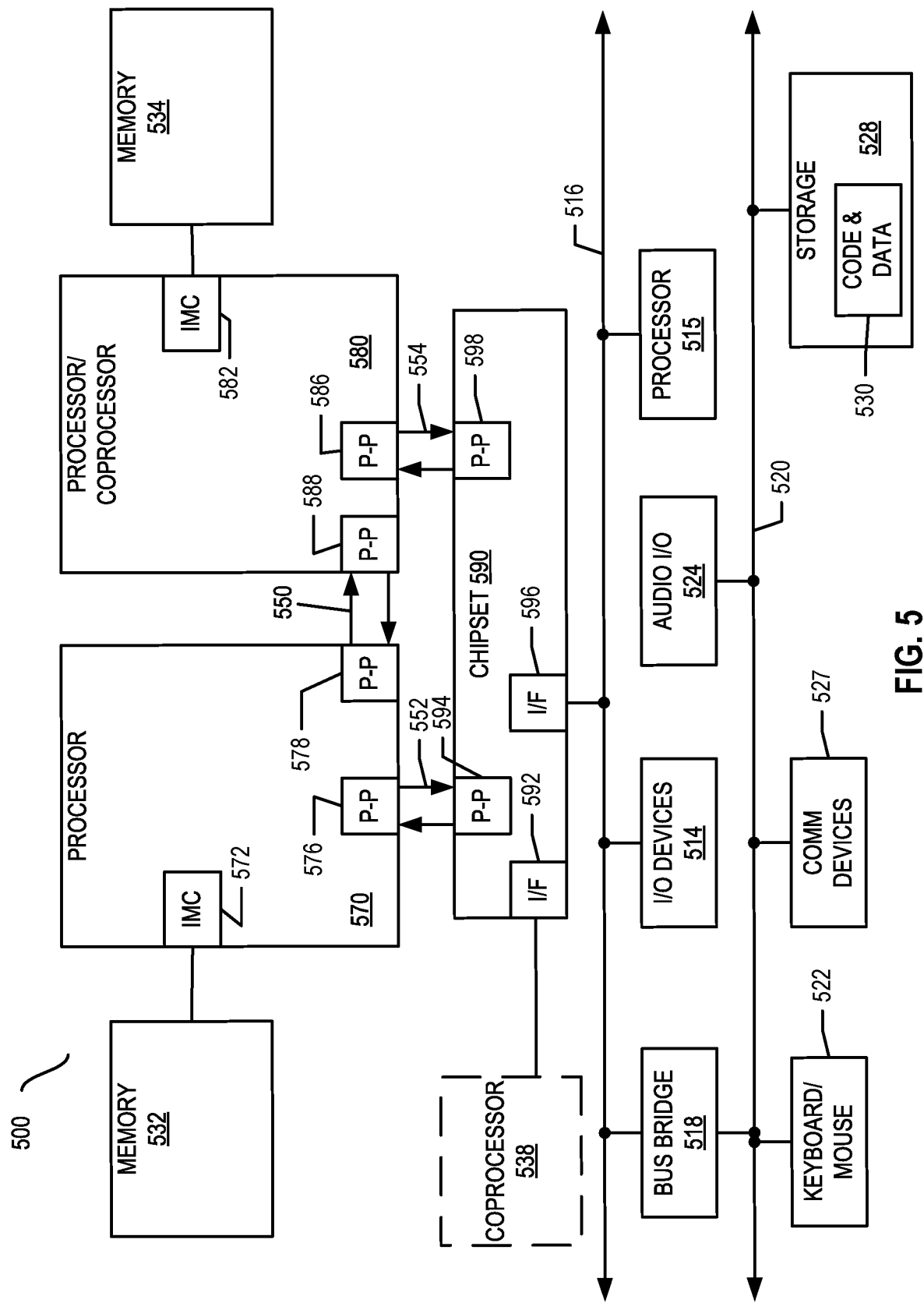

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 coprocessor 445.

Processors 570 and 580 are shown including integrated memory controller (IMC) units 572 and 582, respectively. Processor 570 also includes as part of its bus controller unit's point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 592. In one embodiment, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Figure 6:
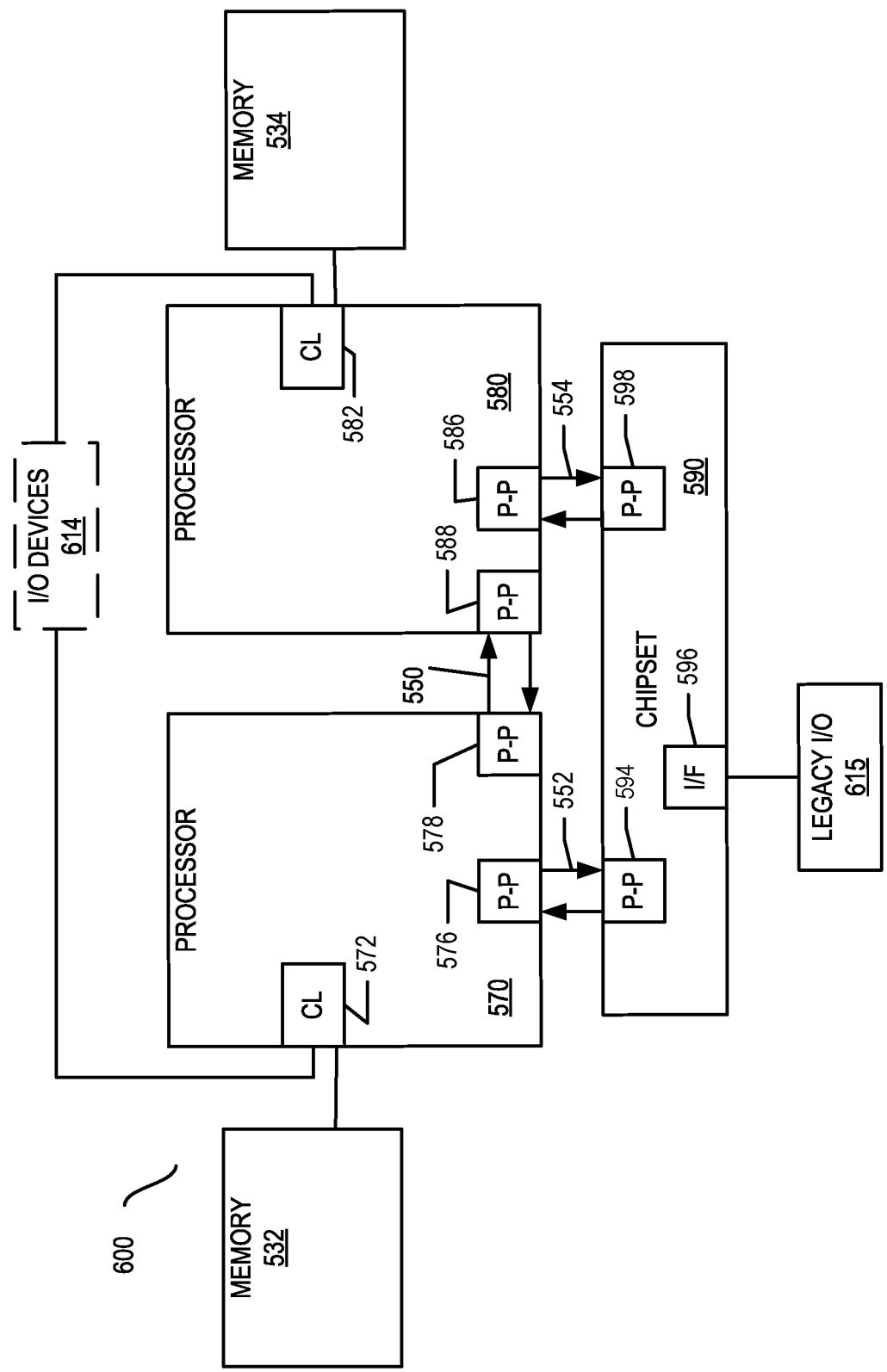

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 572 and 582, respectively. Thus, the CL 572, 582 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
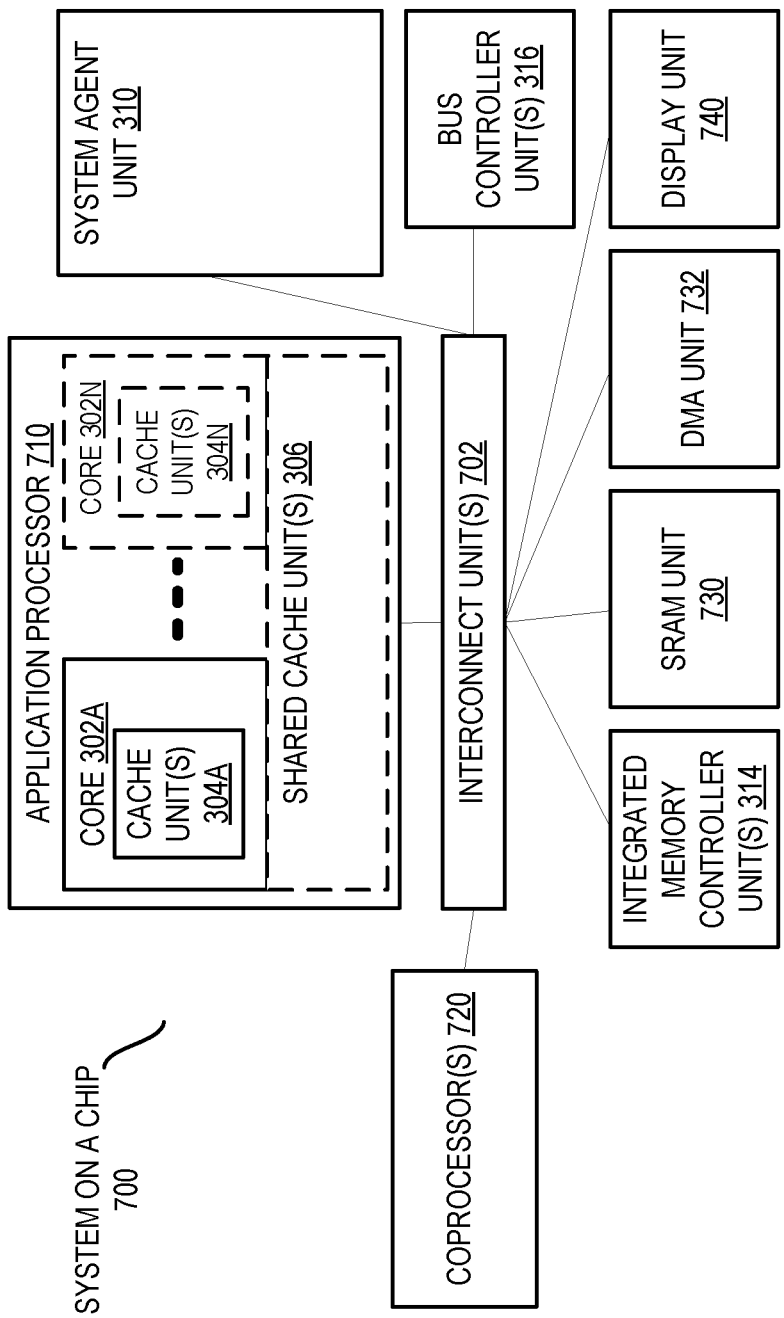

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, which include cache units 304A-N, and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor, general-purpose processors, server processors or processing elements for use in a server-environment, security coprocessors, high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Concluding Remarks

Embodiments of the mechanisms disclosed herein may be implemented in hardware, software, firmware, or a combination of such implementation approaches. Embodiments of the invention may be implemented as computer programs or program code executing on programmable systems comprising at least one processor, including, e.g., general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Instructions to be executed by a processor core according to embodiments of the invention may be embodied in a "generic vector friendly instruction format" which is detailed below. In other embodiments, such a format is not utilized and another instruction format is used, however, the description below of the write-mask registers, various data transformations (swizzle, broadcast, etc.), addressing, etc. is generally applicable to the description of the embodiments of the instruction(s) above. Additionally, exemplary systems, architectures, and pipelines are detailed below. Instructions may be executed on such systems, architectures, and pipelines, but are not limited to those detailed.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
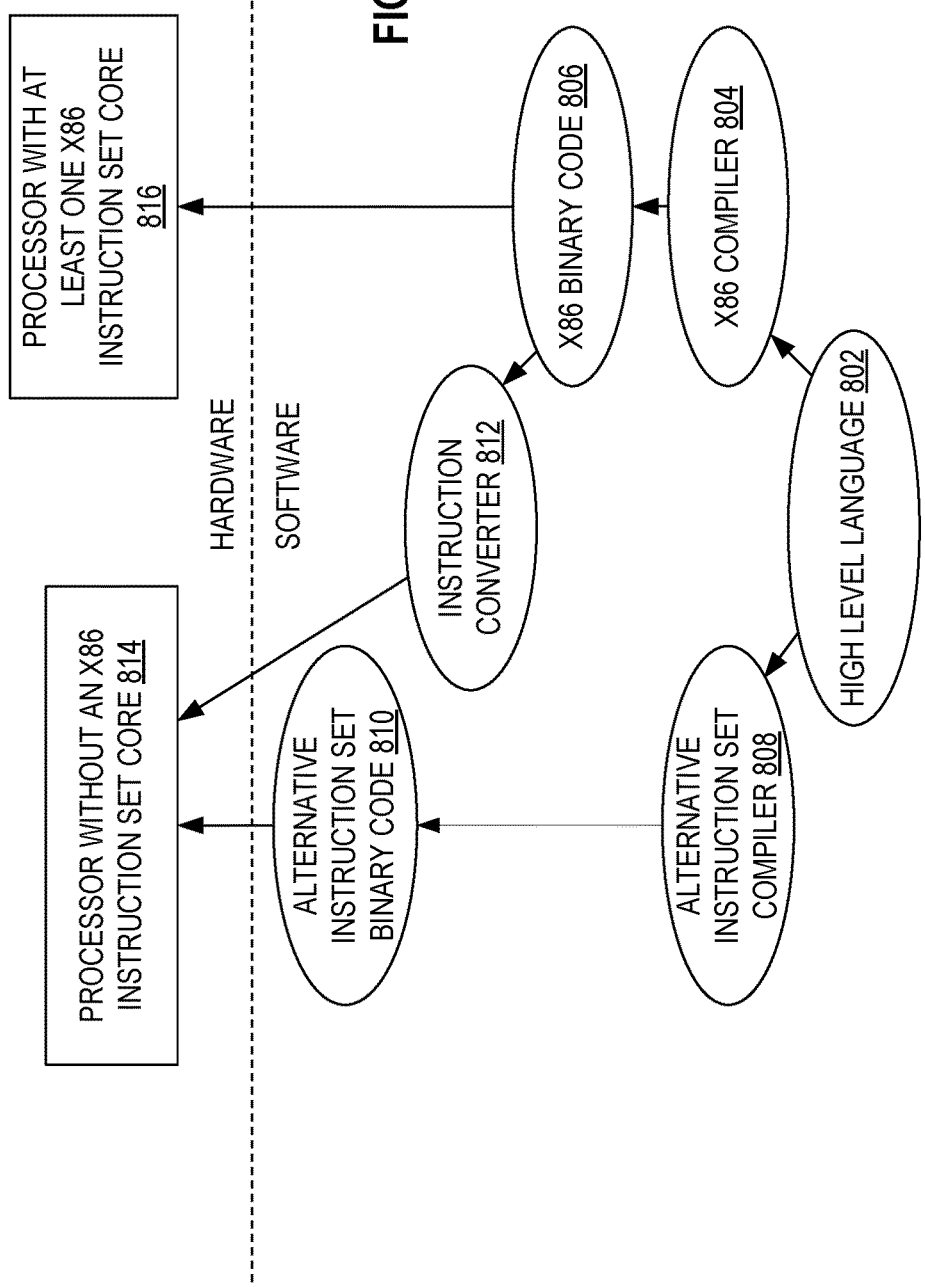
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high-level language 802 may be compiled using an x86 compiler 804 to generate x86 binary code 806 that may be natively executed by a processor with at least one x86 instruction set core 816. The processor with at least one x86 instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 804 represents a compiler that is operable to generate x86 binary code 806 (e.g., object code) that can, with or without additional linkage processing, be executed on the processor with at least one x86 instruction set core 816. Similarly, FIG. 8 shows the program in the high level language 802 may be compiled using an alternative instruction set compiler 808 to generate alternative instruction set binary code 810 that may be natively executed by a processor without at least one x86 instruction set core 814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 812 is used to convert the x86 binary code 806 into code that may be natively executed by the processor without an x86 instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have an x86 instruction set processor or core to execute the x86 binary code 806.

Operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

One or more parts of embodiments of the invention may be implemented using different combinations of software, firmware, and/or hardware. Embodiments may be implemented using an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) may include hardware and software, such as a set of one or more processors coupled to one or more machine-readable storage media to store code for execution on the set of processors and/or to store data. For instance, an electronic device may include non-volatile memory containing the code since the non-volatile memory may persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
   configuration storage to store an indicator to enable a restricted speculative execution mode of operation of the processor, wherein the processor is to restrict speculative execution when operating in restricted speculative execution mode;
   an execution circuit to perform speculative execution; and
   a controller to restrict speculative execution by the execution circuit when the restricted speculative execution mode is enabled, wherein restricting speculative execution includes preventing training of a hardware prefetcher based on a prefetch operation without preventing the prefetch operation, and wherein the prefetch operation trains the hardware prefetcher while in a non-restricted speculative execution mode.

2. The processor of claim 1, wherein speculative execution is restricted to prevent the speculative execution from leaving persistent observable side effects.

3. The processor of claim 1, wherein the controller is to split an operation related to the speculative execution into a first part for forward progress and a second part for performance.

4. The processor of claim 1, wherein the controller is to determine that a speculation frontier is reached.

5. The processor of claim 4, wherein the controller is to restrict the speculative execution until the speculation frontier is reached.

6. The processor of claim 4, wherein the controller is to allow the speculative execution after the speculation frontier is reached.

7. The processor of claim 1, wherein restricting speculative execution includes restricting a load operation.

8. The processor of claim 1, wherein restricting speculative execution includes restricting a store operation.

9. The processor of claim 1, wherein restricting speculative execution also includes preventing the prefetch operation.

10. The processor of claim 1, wherein restricting speculative execution includes restricting a branch operation.

11. The processor of claim 10, further comprising a branch prediction unit (BPU) or an instruction fetch unit (IFU), wherein restricting the branch operation includes preventing training of the BPU or re-steering of the IFU based on the branch operation.

12. A method comprising:
    enabling a restricted speculative execution mode of operation of the processor, wherein the processor is to restrict speculative execution when operating in restricted speculative execution mode;
    fetching an instruction for execution by the processor; and restricting speculative execution of an operation related to the instruction when the restricted speculative execution mode is enabled, wherein restricting speculative execution includes preventing training of a hardware prefetcher based on a prefetch operation without preventing the prefetch operation, and wherein the prefetch operation trains the hardware prefetcher while in a non-restricted speculative execution mode.

13. The method of claim 12, further comprising:
determining that a speculation frontier has been reached with respect to the operation; and
completing the operation.

14. A system comprising:
a system memory; and
a processor including:
configuration storage to store an indicator to enable a restricted speculative execution mode of operation of the processor, wherein the processor is to restrict speculative execution when operating in restricted speculative execution mode;
an execution circuit to perform speculative execution; and
a controller to restrict speculative execution by the execution circuit when the restricted speculative execution mode is enabled, wherein restricting speculative execution includes preventing training of a hardware prefetcher based on a prefetch operation without preventing the prefetch operation, and wherein the prefetch operation trains the hardware prefetcher while in a non-restricted speculative execution mode.

15. The system of claim 14, wherein speculative execution is restricted to prevent the speculative execution from leaving persistent observable side effects in the system.

* * * * *